Oct. 27, 1964   J. D. CHRISTIAN   3,153,941
SPEED REDUCING DEVICES
Filed Oct. 29, 1962   2 Sheets-Sheet 2

INVENTOR
JOSEPH DENNIS CHRISTIAN
By Irwin S. Thompson
ATTY.

United States Patent Office 3,153,941
Patented Oct. 27, 1964

3,153,941
SPEED REDUCING DEVICES
Joseph Dennis Christian, San Francisco, Calif., assignor to Holo-Flite International Incorporated, San Francisco, Calif.
Filed Oct. 29, 1962, Ser. No. 233,632
4 Claims. (Cl. 74—421)

This invention relates to speed reducing devices of the kind having a fast running member and a slow running member, one of which members is mounted on a shaft to be driven, such as the extended driving shaft of a belt conveyor or other machine, and which shaft receives and supports the whole device. These devices are commonly known as "shaft mounted reducers" or "torque arm reducer."

The main object of the present invention is to provide a more compact form of such device to facilitate production costs, ease of packing and transport.

A further object of the invention is to improve mechanical reliability.

Figure 1:
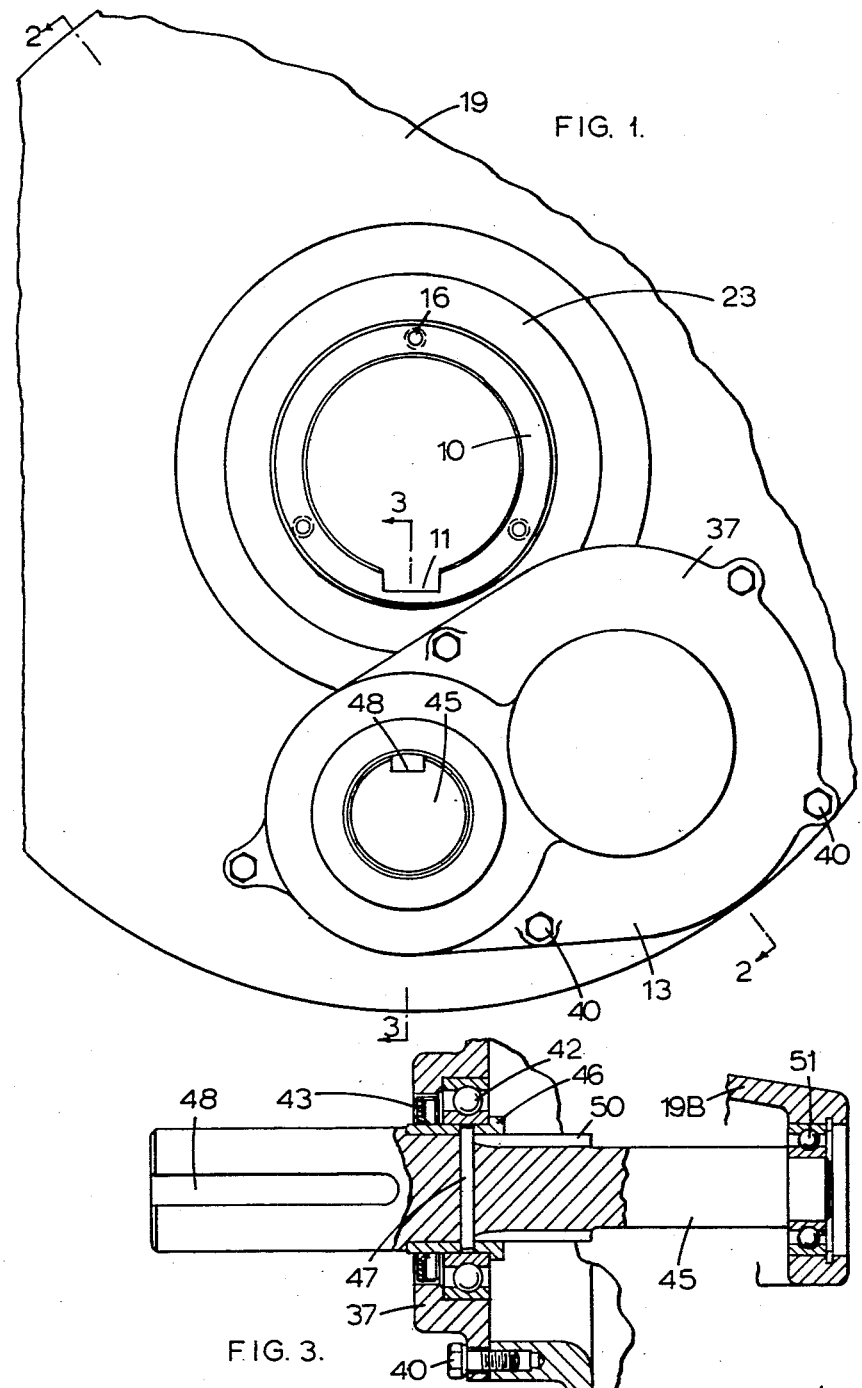
Figure 2:
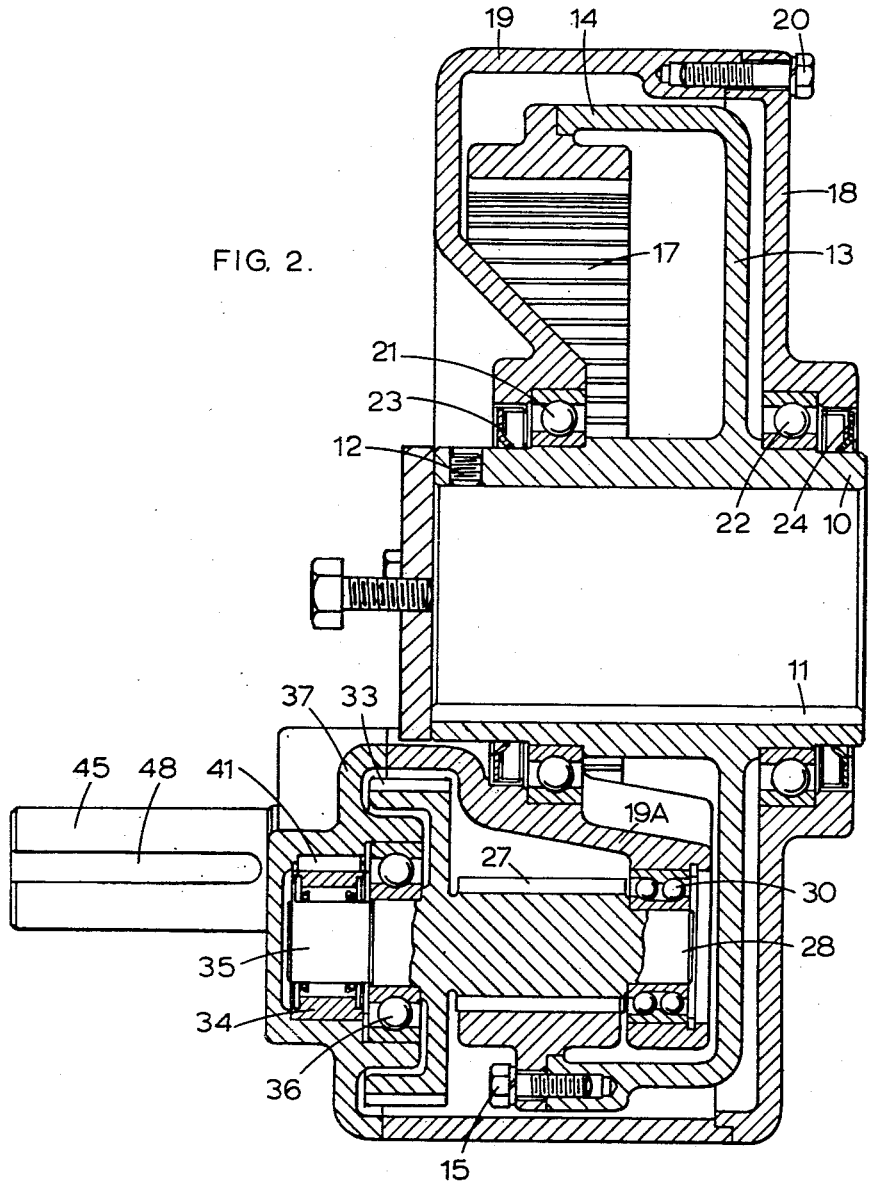

Other objects of the invention will be apparent from the following description of a constructional form of the invention given by way of example with reference to the accompanying diagrammatic drawings wherein:

FIGURE 1 is an end view of the device;
FIGURE 2 is a sectional view on the line 2—2 on FIGURE 1; and
FIGURE 3 is a sectional view on the line 3—3 on FIGURE 1.

A slow running member 10 is normally the output member and is in the form of a sleeve adapted to be mounted on a shaft to be driven. The sleeve has a keyway 11 and grubscrew 12 for fixing to the shaft. This sleeve has a length of 180 to 220 percent (e.g. approximately 200 percent) of its bore diameter.

The member 10 carries a radial projection 13 which may be in the form of a disc or spokes, and has overhanging part 14 at its periphery. Fixed to the part 14 by bolts 15 is an internally toothed ring gear 17 which surrounds the member 10 and is spaced from it radially. The projection 13, part 14, ring gear 17 are all located within the length of the member 10.

A housing is provided consisting of a flange 18, in a plane radially of member 10 and to which a cover 19 is fixed detachably by bolts 20, the cover extending over the ring gear. The housing has an approximately U-shaped radial cross-section so as to surround and enclose the ring gear 17. Two ball bearings 21, 22 are provided operatively between the housing and the member 10, these bearings being spaced apart axially and provided with oil seals 23, 24.

A pinion 27 meshes with the ring gear 17. The pinion 27 has a stub shaft 28 at one end carried by a ball bearing 30 which is a double row thrust bearing located between the ring gear and the radial projection 13. The bearing 30 is mounted in an inwardly shaped part 19A of the cover 19.

The outer end of the pinion 27 is formed with a gear wheel 33 integrally therewith and with a stub-shaft 34 having an extension 35. The stub-shaft 34 is mounted in a ball bearing 36 carried by a cap 37 that is fixed to the cover 19 by bolts 40. The extension 35 is acted on by a roller detent or backstop 41.

The cap 37 carries another ball bearing 42 and oil seal 43. A fast running member or shaft 45 has a bush 46 pinned to it by a pin 47 and this bush runs in the bearing 42. The member 45 extends on both sides of the bearing 42 to provide an inner part in the housing and an outer part having a keyway 48. A prime mover can be directly coupled to shaft 48 but is usually coupled by sheaves, belts or chains and sprockets which can be selected to multiply the overall reduction in speed between the motor and the final driven shaft. The inner part is cut with teeth to form a pinion 50 that meshes with the gearwheel 33. The inner end of the member 45 is carried by a ball bearing 51 that is mounted in a part 19B of the cover 19, this part 19B being a continuation of part 19A.

In a modification the gearwheel 33 and member 45 are omitted and the stub-shaft 34, 35 is then extended to serve as the fast running member.

The housing 18, 19 is cylindrical and free from peripheral protrusions and smaller in diameter than other known torque arm reducers of comparable horsepower.

The bending loads on the driven shaft are less than formerly due to the reduction in axial length of the device.

The construction of the device enables the length of the sleeve member 10 to be less than has heretofore been necessary.

The overall axial dimension of the device and its volume and weight are minimised.

Also the offset distance from the axis of member 45 to axis of member 10 is reduced.

The ring gear 17 has a pitch diameter of 70 to 80 percent of the overall diameter of the housing. This permits pinion 27 to have a large diameter, thereby providing maximum arc of driving contact and greater number of teeth in rolling mesh, lower tooth pressures and greater resistance to shock loading.

The ring gear 17 also serves as a revolving oil carrier and spreads oil over the inside of the housing. This effects lubrication with the member 45 located at any position around the member 10. A good cool running is also achieved.

The high speed gearing 27, 33, 50 is carried by the cap 37 which is very convenient for assembly and replacement.

The construction facilitates the use of a simple removal device for jacking the device off of the shaft.

The device may be connected with a torque arm device for absorbing reverse torque.

The device can be directly flanged to the machine to be driven such as a screw conveyor without using a torque arm, since the flange connection absorbs the reverse torque.

I claim:

1. A speed reducing device comprising a slow running member, a radial projection on said member, an internally toothed ring gear carried by said projection, said ring gear surrounding said member and being spaced radially therefrom, a housing surrounding said ring gear and member, said member and housing enclosing said ring gear, two bearings spaced apart axially of said member and operatively disposed between the member and the housing, a pinion meshing with the ring gear, said pinion having an inner end, the axis of said pinion being parallel to and offset from the axis of said member, a third bearing carried by the housing and supporting said inner end of said pinion, said third bearing being disposed between the ring gear and said radial projection, and a fast running member operatively connected with said pinion.

2. A speed reducing device comprising a slow running sleeve member, a radial projection on said member, an internally toothed ring gear carried by said projection, said ring gear surrounding said member and being spaced radially therefrom, a housing surrounding said ring gear and member, said member and housing enclosing said ring gear and projection, two bearings spaced apart axially of said member and operatively disposed between the member and the housing, said housing comprising a circular flange disposed radially of said sleeve member and a circular cover detachably fixed to the flange and extending over the ring gear, a pinion meshing with the ring gear, said pinion having an inner end, the axis of said pinion being parallel to and offset from the axis of said member, a third bearing carried by the cover and supporting said inner end of said pinion, said third bearing being disposed between the ring gear and said radial projection, and a fast running member operatively connected with said pinion.

3. A speed reducing device comprising a slow running member, a radial projection on said member, an internally toothed ring gear carried by said projection, said ring gear surrounding said member and being spaced radially therefrom, a housing surrounding said ring gear and member, said member and housing enclosing said ring gear, two bearings spaced apart axially of said member and operatively disposed between the member and the housing, a first pinion meshing with the ring gear, said first pinion having an inner end, the axis of said first pinion being parallel to and offset from the axis of said member, a third bearing carried by the housing and supporting said inner end of said first pinion, said third bearing being disposed between the ring gear and said radial projection, a gearwheel on the outer end of the first pinion, a fast running member rotatably carried by the housing, and a second pinion on said fast running member in mesh with said gearwheel.

4. A speed reducing device comprising a slow running member, a radial projection on said member, an internally toothed ring gear carried by said projection, said ring gear surrounding said member and being spaced radially therefrom, a housing surrounding said ring gear and member, said member and housing enclosing said ring gear, two bearings spaced apart axially of said member and operatively disposed between the member and the housing, said housing comprising a flange disposed radially of said sleeve member, a cover detachably fixed to the flange and extending over the ring gear and a cap detachably fixed to the cover, a first pinion meshing with the ring gear, said first pinion having an inner end, the axis of said first pinion being parallel to and offset from the axis of said member, a third bearing carried by the housing and supporting said inner end of said first pinion, said third bearing being disposed between the ring gear and said radial projection, a gearwheel on the outer end of the first pinion, a stub-shaft on the outer end of the first pinion beyond said gearwheel, a fast-running member having its axis parallel to and offset from the axis of the first pinion, two bearings carried by the cap supporting respectively the stub-shaft and the fast-running member, a second pinion mounted on the fast running member and meshing with the gearwheel, and a further bearing carried by the cover and supporting the inner end of the fast-running member.

References Cited in the file of this patent
UNITED STATES PATENTS

| | | |
|---|---|---|
| 1,522,068 | Morgan | Jan. 6, 1925 |
| 1,971,968 | Schmitter | Aug. 28, 1934 |
| 2,647,597 | Keese | Aug. 4, 1953 |
| 2,899,822 | Matthews | Aug. 18, 1959 |